Jan. 31, 1933. W. A. REUM 1,896,014
TIRE COVER
Filed Jan. 11, 1932
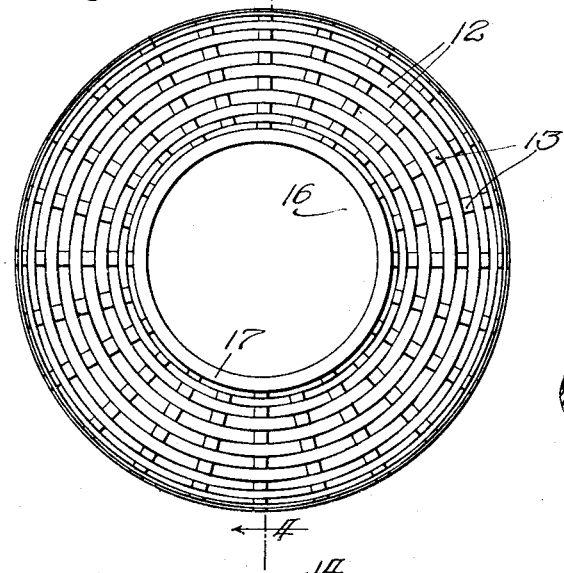
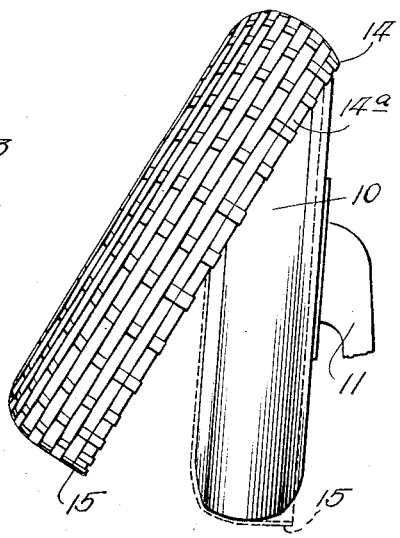
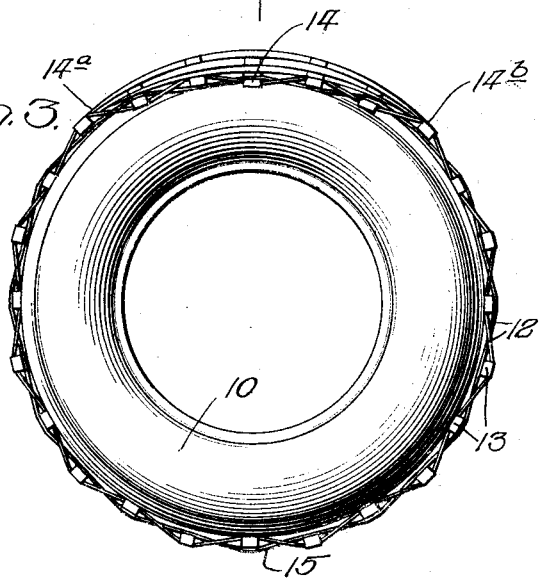
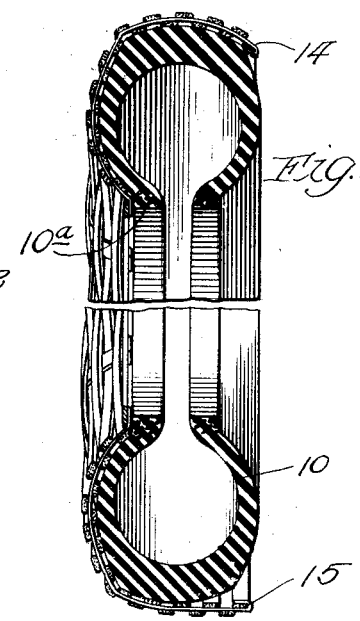
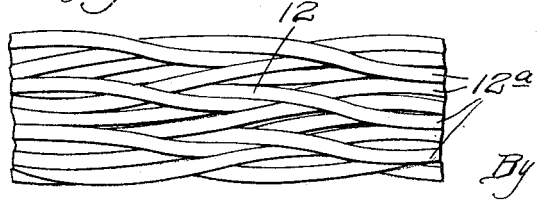
Inventor:
William A. Reum, Patented Jan. 31, 1933

1,896,014

UNITED STATES PATENT OFFICE

WILLIAM A. REUM, OF NILES, MICHIGAN, ASSIGNOR TO NATIONAL-STANDARD COMPANY, OF NILES, MICHIGAN, A CORPORATION OF MICHIGAN

TIRE COVER

Application filed January 11, 1932. Serial No. 586,023.

This invention relates to improvements in tire cover and, more especially, such a cover adapted for use on a spare tire in order to improve the appearance thereof and protect the same.

Among the features of my invention is the provision of such a tire cover that can be easily and cheaply made and easily applied or removed from a spare tire. My improved tire cover is also neat in appearance, strong and durable.

Other features and advantages of my invention will appear more fully as I proceed with my specification.

In that form of device embodying the features of my invention shown in the accompanying drawing—

Figure 1 is a view in front elevation; Fig. 2 is a view in side elevation showing the manner in which the cover is removed from a tire; Fig. 3 is a view in rear elevation; Fig. 4 is a view taken as indicated by the line 4 of Fig. 1; and Fig. 5 is an enlarged view of a portion of the braided wire tape used in making the tire cover.

As shown in the drawing, 10 may indicate a spare tire carried, for example, on the rack 11.

My improved tire cover may be made of any suitable material. For example, as here shown, it is formed of a wire tape or tapes 12 woven with the radial stakes or staves 13. For the purpose of illustration, the stakes 13 are here shown as sheet metal strips and the tape 12 is formed of a number of wires 12$^a$, 12$^a$ braided together, as shown in Fig. 5.

It is to be understood that a wide range of variations may be employed in the making of either or both the stakes and tape. For example, the tape 12 may be made of other members besides wire or could be a flat sheet metal strip, the same as the stakes. Likewise, the wire 12$^a$, or their equivalents used in making the tape, could be braided together in a variety of ways or woven to form a tape by the use of a cross member or members. That is, the tape 12 could consist of either braided or woven wire.

As here shown, the completed tire cover is semi-rigid. That is, it has a certain degree of elasticity or resiliency so that it can be bent or warped somewhat out of shape, if desired, in placing it on the tire or taking it off.

The tire cover has an opening at one side large enough to permit placement of the same on a tire and a portion of the cover is wide enough to extend beyond the center of the tread of the tire and is curved to conform to the transverse periphery of the tire to form a sort of hook, to retain the tire cover in place on the tire. The curved portion, forming the hook, does not extend far enough around the periphery of the cover to prevent placing the same on the tire. For example, as here shown, said curved portion may extend not more than 90° of the circumference and taper off from the center to its ends. In placing the cover on the tire, this curved portion is hooked over the tire first, as shown in Fig. 2, and the cover then slipped over the tire.

In Fig. 1, the open side is at the rear and in Figs. 2 and 4, the open side is shown at the right. The center of the curved or hook-portion is indicated by 14. As here shown, the tire cover throughout its entire periphery is wide enough to extend beyond the center of the tread of the tire 10. The portion extending beyond the center of said tread, with the exception of the curved or hook-portion 14, is cylindrical, as indicated by 15. The curved portion 14 merges gradually into the cylindrical portion 15. As here shown, such curved portion 14 from one extremity to the other, extends about 90°. These extremities are indicated by 14$^a$ and 14$^b$. That is, the curved or hook-portion extends from 14$^a$ to 14$^b$, being greatest at the center or point 14 from which the curvature or hook becomes less in each direction until it merges into the cylindrical portion 15 at the points 14$^a$ and 14$^b$.

In putting the tire cover on the tire, the hook portion 14 is first hooked over the tire 10, as shown in Fig. 2. The tire cover is then swung into position on the tire. If desired, the tire cover can be made of semi-rigid material. In such case, the curved or hook-portion of the tire can be made somewhat wider and extend further around the periphery than if the cover is made of rigid material.

When the cover is made of semi-rigid material, the same can be flexed or bent somewhat as it is put on the tire. In other words, by making the tire cover of semi-rigid material, there may be a wider, closer and longer hook; and the clearances in general may be made somewhat less.

As here shown, the side of the tire cover opposite the open side is concavely curved inwardly to conform to the curvature of the tire and provided with a central opening 16 substantially the size of the bead $10^a$ of the tire. As here shown, the inner edge of the cover terminates in a ring 17 adapted to lie adjacent the bead $10^a$ of the tire.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A tire cover having an opening at one side large enough to permit placement of the same on a tire, a portion of said cover being wide enough to extend beyond the center of the tread of a tire and curved to form a hook, said cover being formed of radial curved stakes with a metal tape woven on the same to make a semi-rigid fabric.

2. A tire cover as claimed in claim 1 in which the inner ends of the stakes are joined to a ring.

3. A tire cover as claimed in claim 1 in which the metal tape is formed of woven wire.

In witness whereof, I have hereunto set my hand and seal, this 23rd day of November, 1931.

WILLIAM A. REUM.